3,354,229
OXONATION OF CYCLODODECATRIENE TO C₁₃ ALCOHOL

Neville Leverne Cull, Baker, and Lloyd Albert Pine, Baton Rouge, La., assignors to Esso Research and Engineering Company, a corporation of Delaware
No Drawing. Filed Jan. 28, 1964, Ser. No. 340,820
7 Claims. (Cl. 260—617)

This invention relates to a process for the preparation of cyclododecyl carbinol. More particularly this invention relates to a process for the oxonation of cyclododecatriene to cyclododecyl carbinol.

It is well known in the art that carbonyl and hydroxymethyl compounds can be synthesized by the oxonation of aliphatic and cyclic olefinic compounds. Thus, it has been found that cyclododecatriene can be hydroformylated in a manner similar to other cyclic olefins which possess a plurality of isolated double bonds. In one of the processes heretofore known, cyclododecatriene was treated in hexane with a cobalt catalyst at 130–150° C. with a synthesis gas mixture consisting of carbon monoxide at 130 atmospheres and hydrogen at 110 atmospheres. Such process, however, yielded undesirable mixtures of mono-, di-, and trihydroxymethylcyclododecane, that is, 36% monohydroxymethylcyclododecane, 45% of dihydroxymethylcyclododecane and 19% of trihydroxymethylcyclododecane, after a short post-hydrogenation. Thus, the polyfunctional reaction products were clearly predominant and it was quite difficult to get high selectivity to the cyclododecyl carbinol inasmuch as the diols and triols were formed as by-products.

It was then found that the above undesirable side reactions were suppressed by using low molecular weight alcohols as solvents and a synthesis gas mixture having a high hydrogen content. This prior art process, therefore, accomplished the preparation of a mixture of cyclododecane derivatives containing mainly monohydroxymethylcyclododecane by the reaction of cyclododecatriene with carbon monoxide and hydrogen in the presence of catalysts usually employed in oxo synthesis, such as the cobalt salts and in particular cobalt acetate and cobalt naphthenate, followed by subsequent post-hydrogenation of the reaction mixture. This process was characterized, however, in that the molar ratio of carbon monoxide to hydrogen was less than 1:1 and that the reaction is carried out in alcoholic solution, that is, at concentrations of 50 and more percent by weight of alcohol, e.g., ethanol and butanol, said concentrations being based on the triene used.

While the above prior art process was initially attractive, it had the inherent disadvantage of the necessary use of expensive alcoholic solvents and special blends of synthesis gas.

It is an object of the present invention, therefore to provide a process for the direct preparation of cyclododecyl carbinol in high yields and selectivities without resorting to expensive solvents, or to special blends of synthesis gas. Other objects and advantages appear hereinafter.

In accordance with this invention, the above objects are accomplished by reacting cyclododecatriene with carbon monoxide and hydrogen in the presence of a catalyst consisting essentially of a cobalt carbonyl catalyst modified by less than a stoichiometric amount of trialkyl phosphine.

The cyclododecatriene starting material of this invention is known in the art, being prepared by trimerizing butadiene with alkyl metal type catalysts, its preparation and description being disclosed, for example, in Angewandte Chemie, v. 69, No. 11:397 (June 7, 1957). Although four stereo isomers of 1,5,9-cyclododecatriene are theoretically possible only two have thus far been isolated. These are the cis, trans, trans (cis, tr., tr.) and the trans, trans, trans (tr., tr., tr.) as shown by Formulas 1 and 2 below.

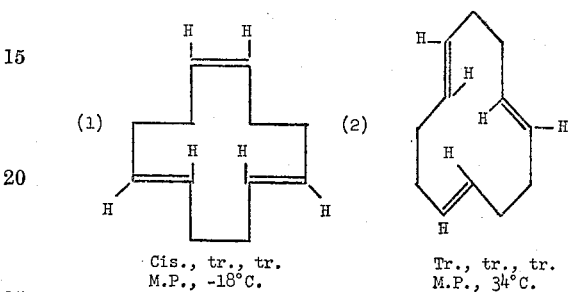

Cis., tr., tr.    Tr., tr., tr.
M.P., -18°C.      M.P., 34°C.

Throughout this specification it will be assumed that either of the isomers above represented or of the other isomers may be utilized or mixtures thereof.

Cyclododecyl carbinol is prepared in accordance with this invention by oxonating 1,5,9-cyclododecatriene with carbon monoxide and hydrogen at the following reaction conditions:

Temperatures of 250 to 450° F., preferably 330 to 390° F., for example, 360° F. Pressures of 500 to 5000 p.s.i.g., preferably 1000 to 3500 p.s.i.g., for example, 3000 p.s.i.g. Hydrogen to carbon monoxide ratios of 0.1:1 to 10:1, preferably 0.3:1 to 5:1, for example, 1.2:1.

The solvents generally employed in the process may be any conventional relatively inexpensive, aromatic-type or paraffinic solvents, the latter being preferred. Non-limiting examples of such solvents include benzene and heptane.

In accordance with this invention, the catalysts employed may be broadly represented as a cobalt carbonyl catalyst modified by less than a stoichiometric amount of trialkyl phosphine. More specifically, the catalysts employed consist essentially of a mixture of cobalt octacarbonyl, i.e., $Co_2(CO)_8$ and a hydrocarbon soluble complex which can be represented by the following formulas:

(3)   $[Co_2(CO)_6(PR_3)_2]$ and (4) 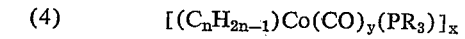  $[(C_nH_{2n-1})Co(CO)_y(PR_3)]_x$ where in both Formulas 3 and 4, R is an alkyl radical containing from 1 to 6 carbon atoms, and in Formula 4, $n$ is an integer from 3 to 6 and $x$ is 1 or 2 and $y$ is 1 or 2 with the proviso that when $x$ is 1 then $y$ is 2, and when $x$ is 2, then $y$ is 1.

With regard to these complexes, it should be noted that some of the species thereof may be isolated in a stable crystalline form and which therefore has unique and unusual properties. Further, all of these active complex species are extremely soluble in both hydrocarbon and polar solvents and in the latter solvents exhibit the conductivity of a typical weak electrolyte. However, the infrared spectrum of each of the complexes is the same in all solvents in which it has been measured, thereby indicating no reaction with the solvent.

In accordance with this invention, the weight ratio of cobalt as cobalt carbonyl to cobalt as phosphine complex is from about 1:0.5 to 1:5 and is preferably from about 1:2 to 1:4. Such ratios are found to be critical since it has been found that if a stoichiometric amount of trialkyl phosphine is added to the cobalt carbonyl, the catalytic effect obtained leaves much to be desired.

The use of low catalyst concentrations, that is, 0.05 to 0.5 weight percent of metal on the weight of cyclododecatriene, is preferred in the process of the present invention. The most suitable range includes catalyst concentrations as low as 0.1 to 0.40 weight percent of metal based on the weight of the triene.

The hydroformylation reaction can be carried out both batchwise and continuously. In addition, at the end of such reactions, suitable crystallization, distillation, etc. may be used to obtain purification of the products described.

Cyclododecyl carbinol is found useful in the preparation of synthetic lubricants and as a plasticizer. Specifically, the phthalate ester of normal butyl and cyclododecyl carbinol has been found to be a good plasticizer for polyvinyl chloride. This alcohol can be oxidized with nitrosyl sulfuric acid to prepare the nylon-12 monomer, dodecanolactam. Additionally, cyclododecyl carbinol is useful as an intermediate to be oxidized to the acid. The acid has now been found to be of value in the form of its lead, cobalt, and manganese salts as a drier in alkyd resin paints. Additionally, cyclododecyl carboxylic acid will find uses in agricultural applications as a defoliant, weed killer, cricket repellent, etc.

The following examples present data obtained in the laboratory which help to define this invention.

*Example I*

Seven hundred grams of a hexane solution of preformed cobalt octacarbonyl (prepared from cobalt acetate in n-heptane) Co wt. percent=2.8=0.33 mole is treated with 70 g. (0.35 mole) of tributyl phosphine. The tributyl phosphine is added slowly to the cobalt octacarbonyl solution with stirring. Carbon monoxide gas is evolved. After all the tributyl phosphine has been added, the mixture is let stand for thirty minutes. A yellow-brown precipitate is filtered off using a Buchner funnel. The precipitate is washed several times with n-hexane. The resulting yellow salt is then slurried with 1200 cc. of hexane and charged to a 2-liter Parr pressure reaction vessel. The autoclave is flushed thoroughly with nitrogen. After flushing the pressure is raised to 200 lbs. with nitrogen and the temperature to 390° F. After holding at 390° F. for one hour, the autoclave is cooled down and the product stored in a bottle under nitrogen. Wt. percent cobalt in the red salt catalyst solution was found to be 1.2.

The mixed catalyst used in the experiments cited below was prepared by mixing weighed amounts of the "red salt" solution and preformed cobalt octacarbonyl solution to give the desired weight percent of cobalt on triene feed.

*Example II*

In an experiment conducted to demonstrate the operability of the process of this invention, the catalyst prepared according to Example I was utilized in a number of oxo-synthesis reactions involving the oxonation of cyclododecatriene (CDT). Further in order to illustrate the superiority of the present catalyst over other catalyst systems, the present catalyst was compared with a catalyst consisting of dicobalt actacarbonyl and a catalyst consisting of dicobalt octacarbonyl modified with an equivalent amount of tributyl phosphine referred to herein as the "red salt" catalyst.

Table I, presented below, shows in tabular form the yields of cyclododecyl carbinol, i.e., $C_{13}OH$, obtained using heptane solvent with these catalyst systems at various temperatures. The specific conditions employed are set forth below.

TABLE I.—OXONATION OF CYCLODODECATRIENE

[Heptane solvent, 0.3 wt. percent Co on CDT, 3000 p.s.i.g. Syn. gas of 1.2/1.0 $H_2$/CO mole ratio]

| | 300° F. | 360° F. | 390° F. |
|---|---|---|---|
| Catalyst | $Co_2(CO)_8$ | $Co_2(CO)_8$ | $Co_2(CO)_8$. |
| $C_{13}$ OH Yield | 55.2 | 69.0 | 61.9. |
| Catalyst | | Red Salt [1] | Red Salt.[1] |
| $C_{13}$ OH Yield | | 70.9 | 79.0. |
| Catalyst | | Mixed [2] | Mixed.[2] |
| $C_{13}$ OH Yield | | 76.4 | 82.2. |
| Catalyst | | Mixed [3] | |
| $C_{13}$ OH Yield | | 77.1 | |

[1] $Co_2(CO)_8$ modified with equivalent amount of tributyl phosphine.
[2] 0.1 wt. percent cobalt as $Co_2(CO)_8$–0.2 wt. percent cobalt as red salt.
[3] 0.06 wt. percent cobalt as $Co_2(CO)_8$–0.24 wt. percent cobalt as red salt.

It is apparent from the above table that use of the mixed catalyst, that is, the $Co_2(CO)_8$ modified by less than the stoichiometric amount of tributyl phosphine according to this invention resulted in better yields than those obtained with either preformed $Co_2(CO_8)_8$ or the "red salt" catalyst also used alone. This is quite surprising and evidences synergistic effects which have not been heretofore encountered in the oxo catalyst art.

*Example III*

Table II gives the results of a series of control runs using preformed $Co_2(CO)_8$ catalyst in ethanol. The yield of cyclododecyl carbinol with this catalyst-solvent system reaches a maximum at about 360° F. When the temperature is raised to 390° F., the cyclododecyl carbinol yield decreases due to some of the cyclododecatriene being hydrogenated to cyclododecane rather than being oxonated. From a comparison with the results of Example I, it can be seen that better yields can be obtained at 390° F. using the mixed catalyst of this invention in a simple paraffinic solvent than are possible using conventional catalysts even under idealized conditions, i.e. in low molecular weight alcohols, temperature, etc. In addition, a series of runs was made using the red salt catalysts in ethanol. As expected, yields were poorer than in heptane as it is known that alcoholic solvents have a deleterious effect on these catalysts.

TABLE II.—OXONATION OF CDT IN ETHANOL, 0.3 WT. PERCENT Co ON CDT

[30 p.s.i.g. synthesis gas of 1.2 $H_2$/CO mole ratio]

| Temp., ° F | 300 | 360 | 390 |
|---|---|---|---|
| $C_{13}$ OH Yield | 65.2 | 78.5 | 71.2 |

*Example IV*

A series of additional batch runs were made on the oxonation of cyclododecatriene to produce cyclododecyl carbinol. The main objective in these runs was to try to evaluate the necessity of using a low molecular weight alcohol as solvent, and a high hydrogen content synthesis gas in order to get good selectivity to the $C_{13}$ mono alcohol.

In the batch tests, the best yield obtained was about 71%. Our runs did show an advantage for the use of an alcohol over hydrocarbon as solvent in yield and in a lower temperature of initiation. Only a small yield increase was indicated for increasing the $H_2/CO$ ratio of the synthesis gas. Results from typical runs are summarized below.

| Solvent | Catalyst | $H_2/CO$ Mole Ratio | Temp., °F. | $C_{13}$ Alcohol Yield, Mol Percent |
|---|---|---|---|---|
| Ethanol | Cobalt Decanoate | 1.2 | 275 | 67.2 |
| Do | do | 2.1 | 275 | 70.8 |
| Do | Cobalt Acetate | 2.1 | 300 | 65.2 |
| Do | $Co_2(CO)_8$ | 1.2 | 390 | 71.2 |
| Heptane | $Co_2(CO)_8$ | 2.1 | 300 | 55.2 |
| Do | "Red Salt"+$Co_2(CO)_8$ | 1.2 | 360 | 76.4 |
| Do | "Red Salt" | 1.2 | 360 | 70.9 |
| Do | "Red Salt"+$Co_2(CO)_8$ | 1.2 | 390 | 82.2 |

The surprising superiority of the mixture of "red salt" i.e. $Co_2(CO)_6(PBu_3)_2$ plus $Co_2(CO)_8$ over the conventional as well as the singular "red salt" catalyst due to its apparent synergistic effect is evidenced by the above data.

What is claimed is:

1. An improved process for the preparation of cyclododecyl carbinol which comprises reacting cyclododecatriene with carbon monoxide and hydrogen in the presence of a catalyst consisting essentially of $Co_2(CO)_8$ and a hydrocarbon soluble complex selected from the group consisting of $$[Co_2(CO)_6(PR_3)_2]$$
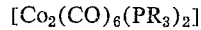
and $$[(C_nH_{2n-1})Co(CO)_y(PR_3)]_x$$
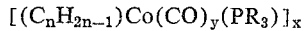

wherein R is an alkyl radical containing from 1 to 6 carbon atoms, $n$ is an integer from 3 to 6 and $x$ is 1 or 2 and $y$ is 1 or 2 with the proviso that when $x$ is 1 then $y$ is 2 and when $x$ is 2, then $y$ is 1 and the weight ratio of cobalt as $Co_2(CO)_6$ to cobalt as hydrocarbon soluble complex is about 1:0.5 to 1:5.

2. The process of claim 1 wherein a paraffinic solvent is employed.

3. The process of claim 1 wherein the carbon monoxide and hydrogen are employed in a molar ratio of from 0.1:1 to 10:1.

4. The process of claim 1 wherein the weight ratio of cobalt as $Co_2(CO)_8$ to cobalt as hydrocarbon soluble complex is from about 1:2 to 1:4.

5. The process of claim 1 wherein the catalyst is employed in amounts of 0.05 to 0.5 weight percent of cobalt based on the weight of cyclododecatriene.

6. The process of claim 1 wherein the hydrogen and carbon monoxide are employed in a molar ratio of from 0.3:1 to 5:1.

7. The process of claim 1 wherein heptane is employed as solvent.

References Cited

UNITED STATES PATENTS

| | | | |
|---|---|---|---|
| 2,619,506 | 11/1952 | Bordenca | 260—617 X |
| 2,919,292 | 12/1959 | Johnson et al. | 260—617 X |
| 3,022,340 | 2/1962 | Block | 260—617 X |
| 3,089,904 | 5/1963 | Lippincott et al. | 260—617 X |
| 3,102,899 | 9/1963 | Cannell. | |
| 3,150,188 | 9/1965 | Eisenmann et al. | 260—617 X |
| 3,184,432 | 5/1965 | Wilke et al. | 260—617 |
| 3,239,569 | 3/1966 | Slaugh et al. | 260—617 X |

LEON ZITVER, *Primary Examiner.*

T. G. DILLAHUNTY, *Assistant Examiner.*